United States Patent [19]

Valley

[11] Patent Number: 5,165,727
[45] Date of Patent: Nov. 24, 1992

[54] COUPLING APPARATUS FOR PIPES AND HOSES

[75] Inventor: Harold J. Valley, Irvine, Calif.
[73] Assignee: Modern Faucet Mfg. Co., Los Angeles, Calif.
[21] Appl. No.: 670,280
[22] Filed: Mar. 15, 1991
[51] Int. Cl.[5] .............................................. F16L 25/00
[52] U.S. Cl. ...................................... 285/12; 285/175; 285/390
[58] Field of Search ................... 285/12, 175, 355, 390

[56] References Cited

U.S. PATENT DOCUMENTS

| | | | |
|---|---|---|---|
| 2,533,885 | 12/1950 | Hill | 285/175 X |
| 2,702,201 | 2/1955 | Romanelli et al. | 285/175 X |
| 3,381,978 | 5/1968 | Faustini | 285/175 X |
| 4,060,264 | 11/1977 | Gajajiva | 285/175 |
| 4,763,693 | 8/1988 | Valley | 137/801 |
| 4,877,278 | 10/1989 | Valley | 292/350 |
| 4,971,366 | 11/1990 | Towsley | 285/175 X |

*Primary Examiner*—Michael F. Trettel
*Attorney, Agent, or Firm*—Lackenbach Siegel Marzullo Aronson and Greenspan

[57] ABSTRACT

Coupling for connecting the end of a hose or a pipe to an external threaded shaft includes a nipple and a coupling nut. The nipple has a bore extending along the length of its longitudinal axis and connects at one end to the end of the hose to be connected. An external annular groove is included and an external threaded segment is disposed adjacent such groove. The coupling nut has two end portions. A first end portion includes a first internal threaded nut segment disposed therein for threadedly engaging the external threaded segment of the nipple. A second end portion has a second internal threaded segment disposed therein for threadedly engaging the external threaded shaft. Moreover, an internal annular groove is disposed adjacent to both of the internal threaded segments of the nut for receiving the external threaded segment of the nipple upon insertion of the nipple in the coupling nut and after the external threaded segment of the nipple has been axially threadedly displaced past the first internal threaded segment. The external annular groove of the nipple receives the first internal threaded segment of the nut upon insertion of the nipple in the coupling nut and after the first internal threaded segment has been axially threadedly displaced past the external threaded nipple segment. Thus, the coupling nut is rotatably supported by the nipple.

10 Claims, 3 Drawing Sheets

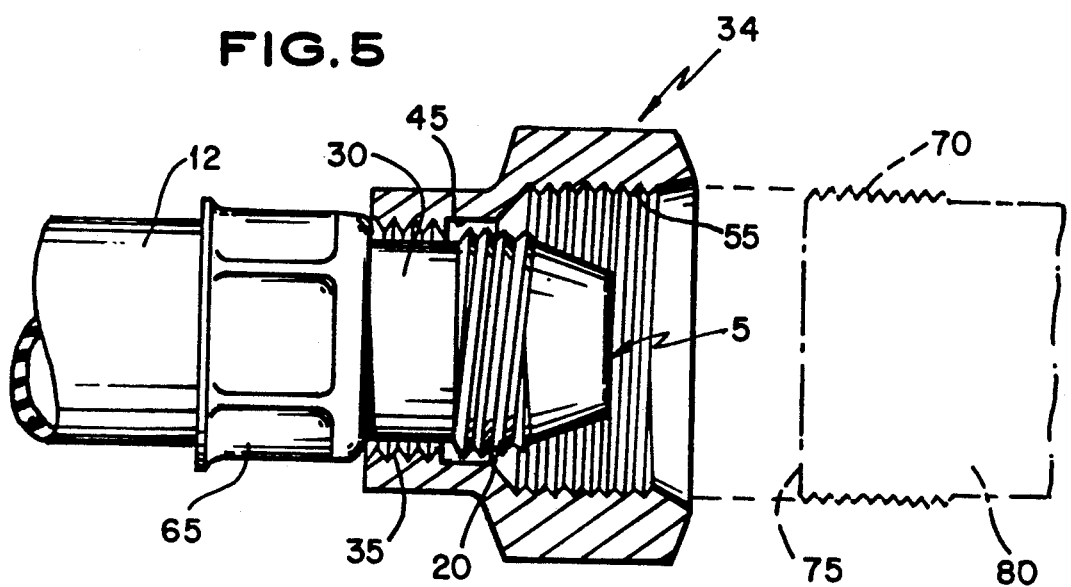
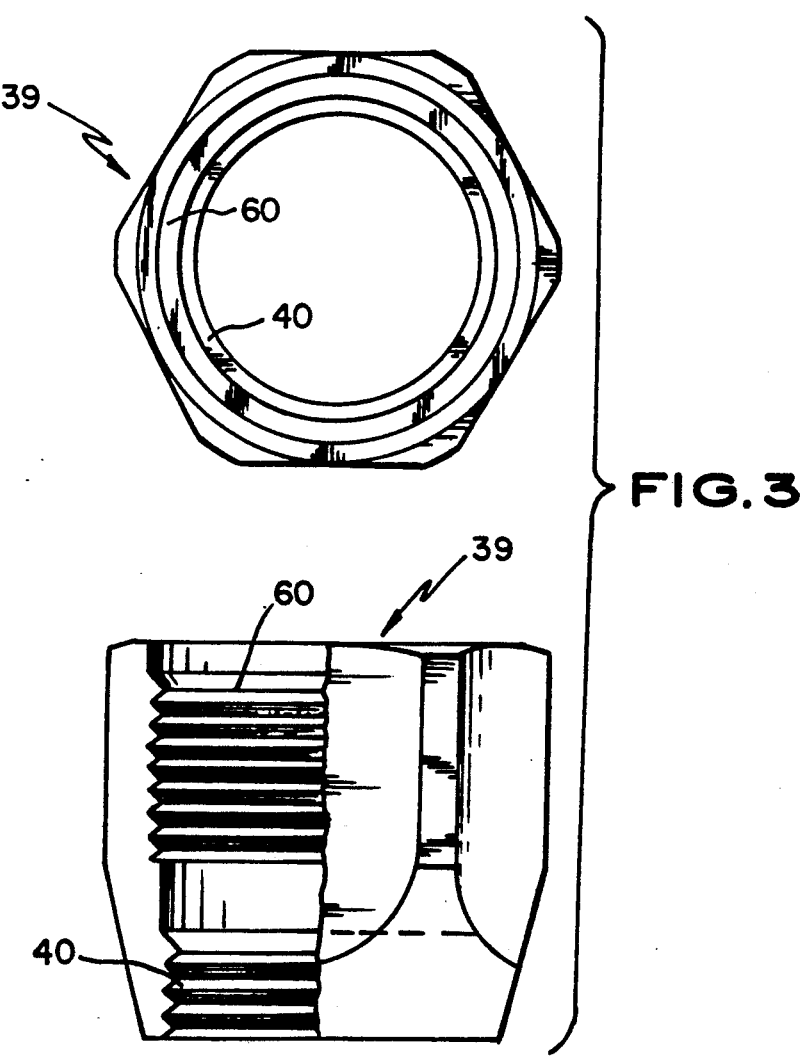

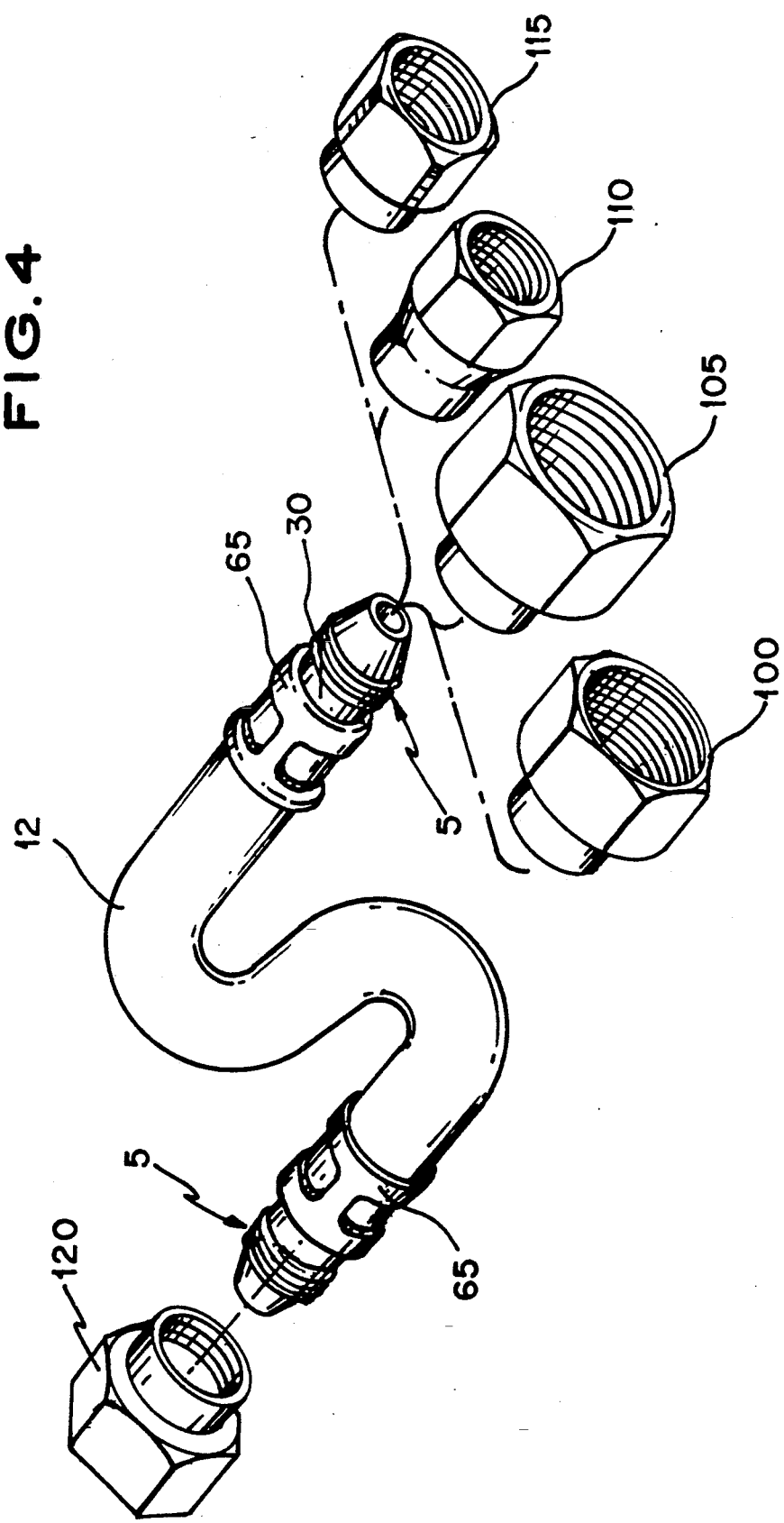

COUPLING APPARATUS FOR PIPES AND HOSES

TECHNICAL FIELD

This invention relates in general to couplings for joining pipes or hoses and, more particularly, to couplings of the "uniontype" having a removable and interchangeable coupling nut.

BACKGROUND OF THE INVENTION

A variety of different type of hose coupling devices are generally known. For example, U.S. Pat. No. 4,266,813 to Oliver and U.S. Pat. No. 4,586,733 to Andersen, Jr. disclose universal couplers which are used for attaching to hoses or bottles with different thread diameters and thread pitches; with Andersen, Jr. being used primarily for chromatography equipment. U.S. Pat. No. 4,126,338 to Cole et al. discloses a threaded coupling in which the connecting threads are disposed on a replaceable sleeve; and U.S. Pat. No. 4,236.736 to Andersen discloses hose coupling having means for gripping the ends of the hoses to be connected.

Moreover, U.S. Pat. No. 3,243,209 to Chertok discloses a high pressure fitting used in union connections, and U.S. Pat. No. 786,516 to phelan discloses a substitute for union-type connectors.

Pipe connectors having left-hand and right-hand threads are also known. For example, U.S. Pat. No. 3,381,978 to Faustini and U.S. Pat. No. 176,796 to Martin each disclose connectors having such oppositely threaded sections. U.S. Pat. No. 470,238 to Goodman also discloses oppositely threaded sections, but relates to a safety bolt.

Additionally, U.S. Pat. No. 2,443,394 to Le Clair discloses a union-type coupling device. The Le Clair device includes a ferrule having a shoulder and a cylindrical portion. An inner part of a union nut is slid over the cylindrical portion of the ferrule and is slidably and turnably lodged between the shoulder and the collar fitted at the end of the cylindrical portion. Means are provided for preventing unscrewing of the outer part of the union nut from its inner part, and the union nut is provided with additional internal threads for meeting with another hose.

However, there remains a need for a pipe or hose coupling having a coupling nut which is easily removable for interchanging other coupling nuts therefor, depending on a user's specific needs. Additionally, the coupling nut should not disengage from the end of the hose when coupling to another hose.

SUMMARY OF THE INVENTION

Generally, the present invention relates to a coupling device for connecting the end of a hose or pipe to an external threaded shaft and includes a nipple having a bore extending along the length of its longitudinal axis. The nipple further includes connecting means for connecting one nipple end to the end of the hose to be connected, an external annular nipple groove disposed adjacent the connecting means, and an external threaded nipple segment disposed adjacent the nipple groove. Further, the nipple groove has an external diameter less than the external diameter of the threads of the external threaded nipple segment.

A coupling nut has first and second end portions. A first end portion includes a first internal threaded nut segment disposed therein for threadedly engaging the external threaded nipple segment, and the external diameter of the nipple groove is less than the diameter of the threads of the first internal threaded nut segment. The second end portion has a second internal threaded nut segment disposed therein for threadedly engaging the external threaded shaft. Moreover, an internal annular nut groove is disposed adjacent both of the internal threaded nut segments for receiving the external threaded nipple segment upon insertion of the nipple in the coupling nut and after the external threaded nipple segment has been axially threadedly displaced past the first internal threaded nut segment.

The external annular nipple groove receives the first internal threaded nut segment upon insertion of the nipple in the coupling nut and after the first internal threaded segment has been axially threadedly displaced past the external threaded nipple segment.

Thus, the coupling nut is rotatably supported when the external threaded nipple segment is received by the internal annular nut groove and the first internal threaded nut segment is received by the external annular nipple groove.

Accordingly, it is an object of this invention to create a hose or pipe coupling device having a coupling nut which is easily removable for interchanging other coupling nuts therefor.

It is another object of the present invention to create a coupling device in which the coupling nut does not disengage from the end of the hose being connected when coupling to another hose.

Other objects, features and advantages of the present invention will become apparent from the following detailed description taken together with the accompanying drawings.

BRIEF DESCRIPTION OF THE DRAWINGS

FIG. 3 is a top view and a partial cross-sectional view of another coupling nut according to the present invention;

FIG. 4 is a perspective view of the coupling device as connected to the ends of a hose; and FIG. 5 is a partial cross-sectional view of a coupling nut as engaged with a nipple and a hose to be connected.

DETAILED DESCRIPTION OF THE PREFERRED EMBODIMENTS

Figure 1:
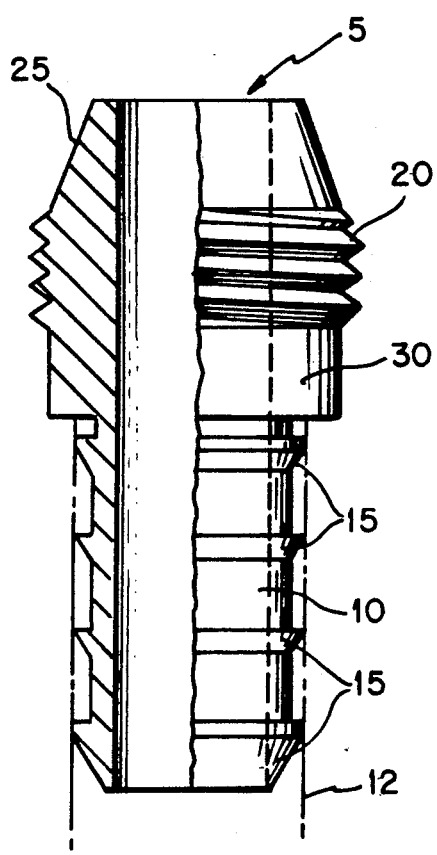
FIG. 1 is a partial cross-sectional view of a nipple according to the present invention.

Referring initially to FIG. 1, a nipple 5 used in the practice of the present invention has a bore extending along the length of its longitudinal axis. One end of the nipple 5 has a shaft segment 10 which includes equally spaced apart ferrules 15 for attaching or connecting the nipple 5 to the end of a pipe or hose 12. regard, any known connecting device can be used in lieu of the ferrules 15 to connect the nipple 5 to the end of the hose 12, for example, a hose clamp. Positioned adjacent to the shaft segment 10 is an annular groove 30., and an external threaded segment 20 is positioned adjacent to the annular groove 30. The annular groove 30 is recessed relative to the external threaded segment 20, i.e., the annular groove 30 has an external diameter less than the external diameter of the external threaded segment 20.

Further, the other end of the nipple 5 has a tapered end segment 25 disposed adjacent to and tapered away from the external threaded segment 20. The tapered end segment 25 creates a seal between the nipple 5 and an external threaded shaft to which the hose 12 is to be connected. The external threaded shaft will be explained in more detail hereinafter. However, other means for creating a seal can be used in lieu of the tapered end segment 25, for example, a washer positioned between the nipple 5 and the external threaded shaft.

Figure 2:
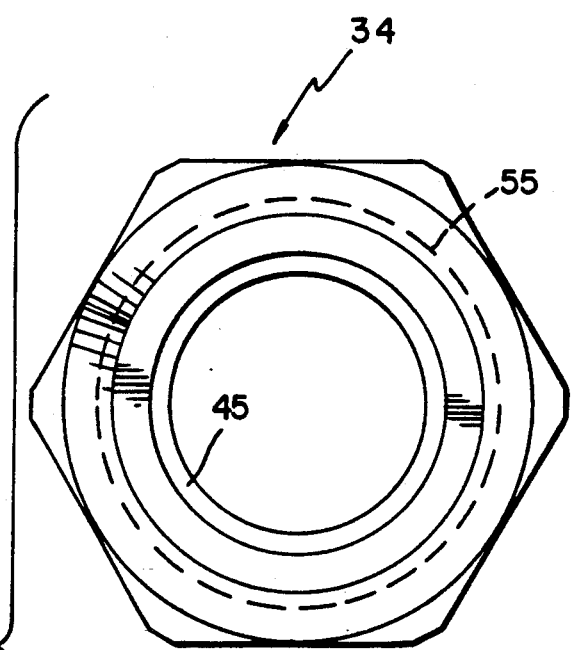
FIG. 2 is a top view and a partial cross-sectional view illustrating the internal operative elements of a coupling nut according to the present invention.
Figure 2:
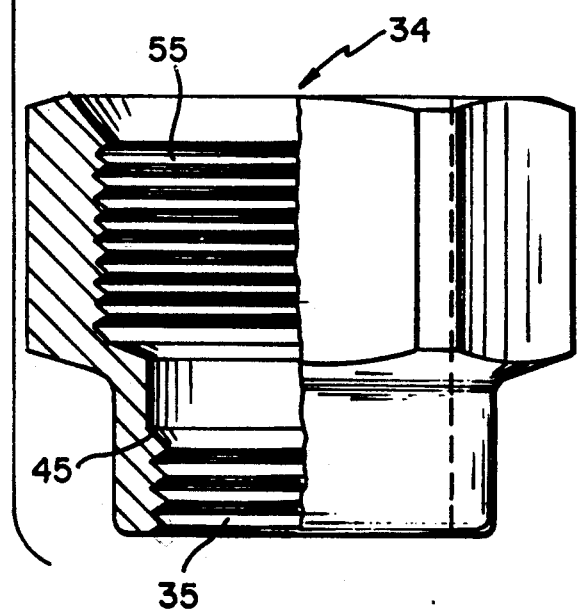

FIGS. 2 and 3 each show a coupling nut 34 and 39 having a first internal threaded segment 35 and 40, respectively. Each segment 35 and 40 is compatible with the threaded segment 20 of the nipple 5. Additionally, each coupling nut 34 and 39 has a second internal threaded segment 55 and 60; and each coupling nut 34 and 39 also has an internal annular groove 45 and 50 disposed adjacent the internal threaded segments of the respective coupling nut 34 and 39.

Note that the second internal threaded segment can be of any diameter and thread size so as to be compatible with the external threaded shaft to which the hose 12 is to be connected. For example, the coupling nut 39 shown in FIG. 3 has a smaller second internal threaded segment 60 than the second internal threaded segment 55 of the coupling nut 34, but the first internal threaded segments 35 and 40 are the same thread size so as to be compatible with the threaded segment 20 of the nipple 5. More particularly, FIG. 4 shows the coupling device of the present invention utilized at both ends of the hose 12. As illustrated, coupling nuts 100, 105, 110 and 120 having various sized second internal threaded segments are interchangeable on the nipple 5, so long as the first internal threaded segments are of the same size and compatible with the threaded segment 20. Thus, advantageously, various applications can be accomplished with the same hose by interchanging the coupling nuts to suit specific needs.

FIG. 5 shows the nipple 5 connected by clamping device 65 to the end of the hose 12 and, by way of example, the coupling nut 34 is shown engaged with the nipple 5. The nipple 5 is inserted into the coupling nut 34 and after the external threaded segment 20 has been axially threadedly displaced past the first internal threaded segment 35, the internal annular groove 45 receives the external threaded segment 20. Moreover, the external annular groove 30 receives the first internal threaded segment 35 upon such insertion and axially threaded displacement. Thus, the internal annular groove 45 has a longitudinal length equal to or greater than the longitudinal length of the external threaded segment 20 for receiving the external threaded segment 20; and the external annular groove 30 has a longitudinal length equal to or greater than the longitudinal length of the first internal segment 35 for receiving the first internal threaded segment 35.

Additionally, the external annular groove 30 has an external diameter less than the external diameter of the external threaded segment 20 and less than the diameter of the threads of the first internal threaded segment 35; and the threads of the threaded segment 20 has an external diameter less than the internal diameter of the internal annular groove 45 which has an internal diameter greater than the internal diameter of the first internal threaded segment 35. As such, the coupling nut 34 is rotatably supported by the nipple 5 when the external threaded segment 20 is received by the internal annular groove 45 and the first internal threaded segment 35 is received by the external annular groove 30.

As engaged, the coupling nut 34 is free to rotate and allow for threading of the second internal segment 55 with an external threaded shaft to which the hose 12 is to be connected. In this regard, preferably the internal threaded segments 35 and 55 of the coupling nut 34 have oppositely directed threads. For example, if the external threaded shaft 70 has right-hand threads, then the second internal threads 55 must also have right-hand threads for threadedly engaging with the external threaded shaft 70; and the first internal threads 35 should be left-handed. Moreover, so as to be compatible with the left-hand threads of the first internal threaded segment 35, the threaded segment 20 of the nipple 5 must also have left-hand threads. Therefore, left-hand rotation of the coupling nut 34 is required to threadedly engage the coupling nut 34 with the nipple 5, and rotation of the coupling nut 39 in the same left-handed direction will threadedly engage the second internal threaded segment 55 with the external threaded shaft 70. Thus, since the first internal threads 35 will not engage with the threaded segment 20 when rotating in the left-hand direction, unintentional removal of the coupling nut 34 from the nipple 5 when threadedly engaging the coupling nut 34 with the external threaded shaft 70 is prevented. Right-hand rotation combined with axial displacement of the coupling nut 34 is required to force the internal threaded segment 35 to engage with the threaded segment 20 for removal of the coupling nut 34 from the nipple 5.

Accordingly, if the external threaded shaft 70 has left-hand threads, then the second internal threaded segment 55 must also have left-hand threads, and in order to derive the benefits as noted above, the first internal threads 35 should have right-hand threads, and therefore the threaded segment 20 must also have right-hand threads.

Note that the external threaded shaft 70 has a first end 75 which is inserted into the coupling nut 34 and a second end 80 which is suitably connected to whatever device a user requires to connect. For example, the second end 80 can be connected to another hose or pipe, an infusion pump, a storage apparatus, etc.

While the invention is disclosed and more particularly described with the presently preferred embodiment, it is not intended that the invention be limited to the described embodiment It will be obvious to those skilled in the art that modifications may be made without departing from the scope and spirit of the invention. Thus, it is intended that the appended claims cover all equivalent variations as may be subsequently contemplated.

We claim:

1. A device for connecting the end of a hose to an external threaded element, comprising a combination:
a nipple having a bore extending along the length of its longitudinal axis, connecting means for connecting one nipple end to the end of the hose to be connected, and external annular nipple groove disposed adjacent said connecting means, an external threaded nipple segment adjacent said nipple groove, said nipple groove having an external diameter less than the external diameter of the threads of the external threaded nipple segment;
a coupling nut having a first end portion with a first internal threaded nut segment disposed therein for threadedly engaging the external threaded nipple segment, the external diameter of said nipple groove being less than the diameter of the threads of the first internal threaded nut segment, said coupling nut further including a second end portion with a second internal threaded nut segment disposed therein for threadedly engaging the external threaded element, an internal annular nut groove disposed adjacent both of the internal threaded nut segments for receiving the external threaded nipple segment upon insertion of the nipple in the coupling nut and after the external threaded nipple segment has been axially threadedly displaced past the first internal threaded nut segment;

said external annular nipple groove for receiving the first internal threaded nut segment upon insertion of the nipple in the coupling nut and after the first internal threaded segment has been axially threadedly displaced past the external threaded nipple segment;

said coupling nut being rotatably supported when the external threaded nipple segment is received by the internal annular nut groove and the first internal threaded nut segment is received by the external annular nipple groove; and being removable by rotation thereof combined with axial displacement away from the nipple for interchanging the coupling nut with other differently sized coupling nuts having variously sized second internal threads, each having a first internal threaded nut segment compatible with the external threaded nipple segment, and each having a different sized second internal threaded nut segment, for selectively selecting a coupling nut having a second internal threaded nut segment compatible with the external threaded element to be connected; whereby the problems associated with permanently attached coupling nuts are alleviated since said device provides for a multitude of sizes to satisfy substantially any sized connection required for connecting the end of a hose to an external threaded element.

2. A device according to claim 1, wherein the external threaded element and the external threaded nipple segment having oppositely directed threads relative to each other, and the first internal threaded nut segment and the second internal threaded nut segment have oppositely directed threads relatively to each other.

3. A device according to claim 1, wherein the means for attaching the nipple to the end of the hose comprises at least one ferrule.

4. A device according to claim 1, wherein the external threaded nipple segment and first internal threaded nut segment each comprise left-hand threads.

5. A device according to claim 1, wherein the second internal threaded nut segment and external threaded shaft segment each comprise right-hand threads.

6. A device according to claim 1, wherein the second internal threaded nut segment and external threaded shaft segment each comprise right-hand threads.

7. A device for connecting the end of a hose to an external threaded element, comprising in combination: a nipple having a bore extending along the length of its longitudinal axis, connecting means for connecting one nipple end to the end of the hose to be connected, an external annular nipple groove disposed adjacent said connecting means, an external threaded nipple segment adjacent said nipple groove, and having threads directed oppositely from the threads of the external threaded shaft, said nipple groove having an external diameter less than the external diameter of the threads of the external threaded nipple segment; and a coupling nut having a first end portion with a first internal threaded nut segment disposed therein for threadedly engaging the external threaded nipple segment, the external diameter of said nipple groove being less than the diameter of the threads of the first internal threaded nut segment, said coupling nut further including a second end portion with a second internal threaded nut segment disposed therein for threadedly engaging the external threaded shaft, an internal annular nut groove disposed adjacent both of the internal threaded nut segments for receiving the external threaded nipple segment upon insertion of the nipple in the coupling nut and after the external threaded nipple segment has been axially threadedly displaced past the first internal threaded nut segment;

said external annular nipple groove for receiving the first internal threaded nut segment upon insertion of the nipple in the coupling nut and after the first internal threaded segment has been axially threadedly displaced past the external threaded nipple segment;

said coupling nut being rotatably supported when the external threaded nipple segment is received by the internal annular nut groove and the first internal threaded nut segment is received by the external annular nipple groove; and being removable by rotation thereof combined with axial displacement away from the nipple for interchanging the coupling nut with other coupling nuts, each having a first internal threaded nut segment compatible with the external threaded nipple segment, and each having a different sized second internal threaded nut segment, for selectively selecting a coupling nut having a second internal threaded nut segment compatible with the external threaded element to be connected; whereby the problems associated with permanently attached coupling nuts are alleviated since said device provides for a multitude of sizes to satisfy substantially any sized connection required for connecting the end of a hose to an external threaded element.

8. A device according to claim 7, wherein the means for attaching the nipple to the end of the hose comprises at least one ferrule.

9. A device according to claim 7, wherein the external threaded nipple segment and first internal threaded nut segment each comprise left-hand threads.

10. A device for connecting the end of a hose to an external right-hand threaded element, comprising in combination:

a nipple having a bore extending along the length of its longitudinal axis, a shaft segment disposed on one nipple end and including equally spaced apart ferrules for attaching to the end of the hose to be connected, an external annular nipple groove disposed adjacent said shaft segment, an external left-hand threaded nipple segment adjacent the nipple groove, said nipple groove having an external diameter less than the diameter of the threads of the external left-hand threaded nipple segment, and said nipple further including a tapered end segment disposed proximate the other nipple end adjacent to and tapered away form the external left-hand threaded segment; and a coupling nut having a first end portion with an internal left-hand threaded nut segment disposed therein for threadedly engaging the external left-hand threaded nipple segment, the external diameter of said nipple groove being less than the diameter of the threads of the internal left-hand threaded nut segment, said coupling nut further including a second end portion with an internal right-hand threaded nut segment disposed therein for threadedly engaging the external right-hand threaded shaft, an internal annular nut groove disposed adjacent both of the threaded nut segments having a longitudinal length equal to or greater than the longitudinal length of the external left-hand threaded nipple segment for receiving the external left-hand threaded nipple segment upon insertion of the nipple in the coupling nut and after the first internal left-hand segment has been axially threadedly displaced past the first internal left-hand threaded nut segment;

said external annular nipple groove having a longitudinal length equal to or greater than the longitudinal length of the internal left-hand threaded nut segment for receiving the first internal left-hand threaded nut segment upon insertion of the nipple in the coupling nut and after the first internal left-hand threaded segment has been axially threadedly displaced past the external left-hand threaded nipple segment;

whereby said coupling nut being rotatable supported when the external left-hand threaded nipple segment is received by the internal annular nut groove and the first internal left-hand threaded nut segment is received by the external annular nipple groove; and whereby said coupling nut being removable by right-hand rotation thereof combined with axial displacement away from the nipple for interchanging the coupling nut with other coupling nuts of different sizes, each having a first internal threaded nut segment compatible with the external threaded nipple segment, and each having a different sized second internal threaded nut segment, for selectively selecting a coupling nut having a second internal threaded nut segment compatible with the external threaded element to be connected; whereby the problems associated with permanently attached coupling nuts are alleviated since said device provides for a multitude of sizes to satisfy substantially any sized connection required for connecting the end of a hose to an external threaded element.

* * * * *